US012578503B2

(12) United States Patent | (10) Patent No.: | US 12,578,503 B2
Gail | (45) Date of Patent: | Mar. 17, 2026

(54) GENERATING AND MANAGING CALIBRATION DATA FOR SENSORS USED TO OBTAIN WEATHER INFORMATION

(71) Applicant: GOOGLE LLC, Mountain View, CA (US)

(72) Inventor: William B. Gail, Boulder, CO (US)

(73) Assignee: GOOGLE LLC, Mountain View, CA (US)

( * ) Notice: Subject to any disclaimer, the term of this patent is extended or adjusted under 35 U.S.C. 154(b) by 301 days.

(21) Appl. No.: 18/043,821

(22) PCT Filed: Jan. 6, 2021

(86) PCT No.: PCT/US2021/012297
§ 371 (c)(1),
(2) Date: Mar. 2, 2023

(87) PCT Pub. No.: WO2022/150035
PCT Pub. Date: Jul. 14, 2022

(65) Prior Publication Data
US 2023/0266503 A1 Aug. 24, 2023

(51) Int. Cl.
*G01W 1/18* (2006.01)
*G01W 1/02* (2006.01)
*G06Q 50/26* (2024.01)

(52) U.S. Cl.
CPC ................. *G01W 1/18* (2013.01); *G01W 1/02* (2013.01); *G01W 2201/00* (2013.01); *G06Q 50/26* (2013.01); *Y02A 90/10* (2018.01)

(58) Field of Classification Search
CPC ..... G01W 1/18; G01W 1/02; G01W 2201/00; Y02A 90/10; G06Q 50/26
See application file for complete search history.

(56) References Cited

U.S. PATENT DOCUMENTS

| 10,309,856 B2 | 6/2019 | Van De Meulenhof et al. |
| 10,605,633 B2 | 3/2020 | Masson |
| 10,652,333 B2 | 5/2020 | Wouhaybi et al. |
| 2016/0138993 A1 | 5/2016 | Van De Meulenhof et al. |
| 2017/0075037 A1 | 3/2017 | Springer |
| 2017/0102251 A1 | 4/2017 | Masson |

(Continued)

FOREIGN PATENT DOCUMENTS

| JP | H1150901 A | 2/1999 |
| JP | 2004170350 A | 6/2004 |

(Continued)

OTHER PUBLICATIONS

International Search Report and Written Opinion from PCT Apn PCT/US2021/012297 mailed Jul. 12, 2021, 17 pages.

*Primary Examiner* — Lisa M Caputo
*Assistant Examiner* — Christian T Bryant
(74) *Attorney, Agent, or Firm* — Brake Hughes Bellermann LLP

(57) ABSTRACT

A reference devices system (720) for generating and managing calibration data for sensors used to obtain weather information is provided. The reference devices system (720) includes a plurality of reference devices, wherein a reference device (110) of the plurality of reference devices is configured to be calibrated against a weather station (115) and to serve as a calibration reference for a community device (130).

10 Claims, 12 Drawing Sheets

(56) References Cited

U.S. PATENT DOCUMENTS

2019/0121782 A1     4/2019  Sun et al.
2021/0003461 A1*    1/2021  Tarkoma ................ G01D 18/00

FOREIGN PATENT DOCUMENTS

JP        2016528480  A      9/2016
JP        2018534591  A     11/2018
JP        2020503501  A      1/2020
WO        2019180325  A1     9/2019

* cited by examiner

300

Figure 6:
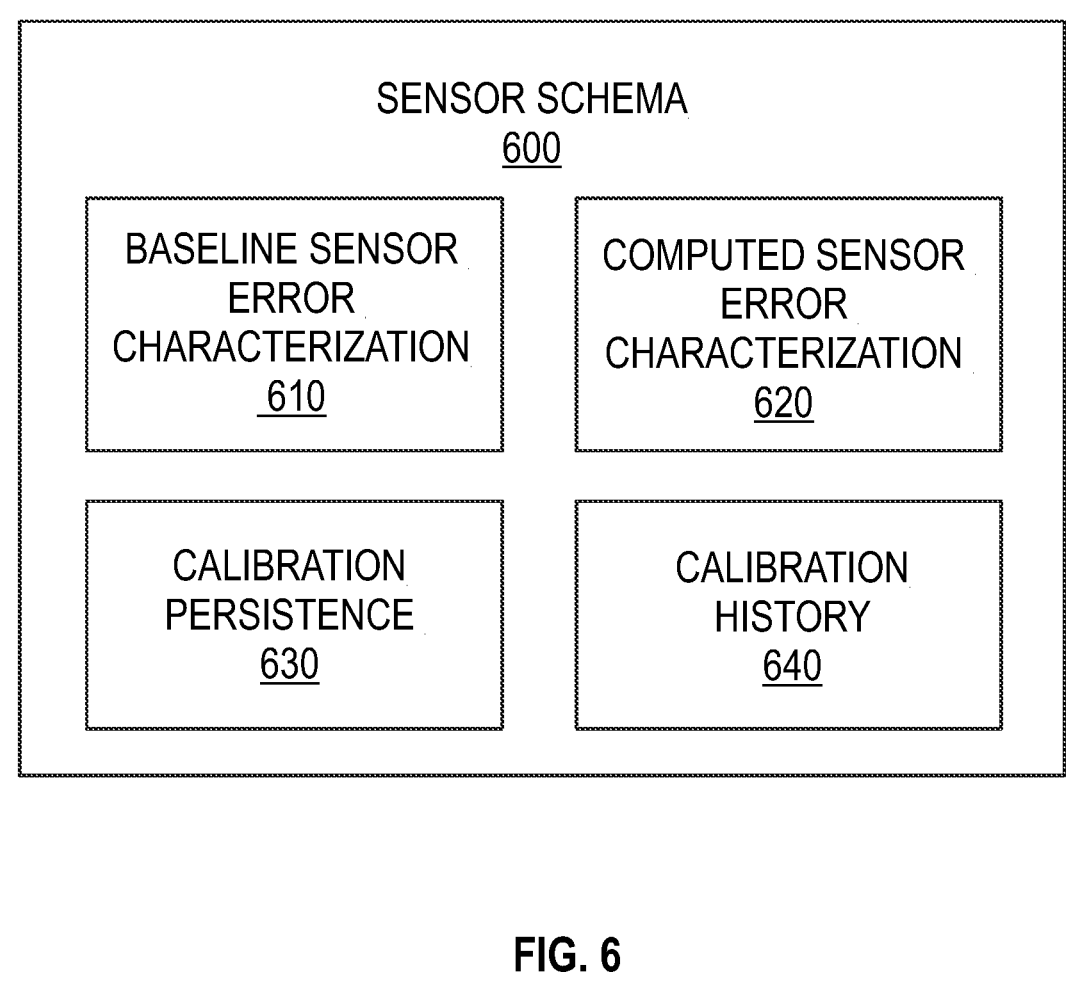

SENSOR SCHEMA
600

BASELINE SENSOR
ERROR
CHARACTERIZATION
610

COMPUTED SENSOR
ERROR
CHARACTERIZATION
620

CALIBRATION
PERSISTENCE
630

CALIBRATION
HISTORY
640

Provide one or more
reference devices — 810

Calibrate the one or more
reference devices against a
weather station — 820

Configure the one or more
reference devices to serve as
a calibration reference for
the community device — 830

900 ⟍

1000 ⟍

Determine a distance between
a reference device and a
community device                  ⌐1010

Compare the distance to a
calibration triggering distance
between the reference device
and the community device          ⌐1020

1100 ⬐

1110

Obtain a measured value
from a weather station

1120

Perform a reference
devices method

GENERATING AND MANAGING CALIBRATION DATA FOR SENSORS USED TO OBTAIN WEATHER INFORMATION

CROSS REFERENCE TO RELATED APPLICATION

This application is a 35 U.S.C. § 371 National Phase Entry Application from PCT/US2021/012297 filed Jan. 6, 2021, designating the U.S., the disclosure of which is incorporated herein by reference in its entirety.

TECHNICAL FIELD

The embodiments described below relate to weather information and, more particularly, to generating and managing calibration data for sensors used to obtain weather information.

BACKGROUND

Widely available mobile devices increasingly include sensors capable of measuring weather conditions, such as temperature, pressure, precipitation, and wind. Examples of such devices include mobile phones, cars and trucks, and drones. In most cases, the primary purpose of the sensor is not to make observations for use in weather estimation/forecasting but rather to assist the operation of the device itself.

It is often expected that these devices correspond to "miniature weather stations" and that their observations can be used in a similar manner as data from high-quality weather stations. A significant challenge is that these sensors are generally of lesser quality and thus are typically less accurate than is desirable for making reliable weather observations. The inaccuracies in these sensors generally makes the weather-related data unusable in its basic form for operations which require high accuracy.

Thus, a means for calibrating such sensors, with the scope of a geographically comprehensive system, is desirable to make the observational data more valuable for use in estimating current weather conditions and forecasting future weather conditions. Accordingly, there is a need for generating and managing calibration data for sensors used to obtain weather information.

SUMMARY

A reference devices system for generating and managing calibration data for sensors used to obtain weather information is provided. According to an embodiment, the reference devices system comprises a plurality of reference devices, wherein a reference device of the plurality of reference devices is configured to be calibrated against a weather station and to serve as a calibration reference for a community device.

A reference devices method for generating and managing calibration data for sensors used to obtain weather information is provided. According to an embodiment, the reference devices method comprises providing one or more reference devices, calibrating the one or more reference devices against a weather station, and configuring the one or more reference devices to serve as a calibration reference for a community device.

A calibration data system for generating and managing calibration data for sensors used to obtain weather information is provided. According to an embodiment, the calibration data system comprises a calibration server configured to determine a calibration hierarchy position of a weather station, a reference device configured to be calibrated against the weather station, and a community device configured to be calibrated against the reference device.

A calibration data method for generating and managing calibration data for sensors used to obtain weather information is provided. According to an embodiment, the calibration data method comprises determining a calibration hierarchy position of a weather station, a reference device configured to be calibrated against the weather station, and a calibration hierarchy position of a community device configured to be calibrated against the reference device.

A calibration triggering system for generating and managing calibration data for sensors used to obtain weather information is provided. According to an embodiment, the calibration triggering system comprises a calibration server configured to determine a distance between a reference device and a community device, compare the distance to a calibration distance threshold between the reference device and the community device, wherein the reference device is calibrated against a weather station.

A calibration triggering method for generating and managing calibration data for sensors used to obtain weather information is provided. According to an embodiment, the calibration triggering method comprises determining a distance between a reference device and a community device and comparing the distance to a calibration distance threshold between the reference device and the community device, wherein the reference device is calibrated against a weather station.

A calibration system (700) for generating and managing calibration data for sensors used to obtain weather information is provided. According to an embodiment, the calibration system comprises a weather station (710) and a reference devices system (720).

A calibration method for generating and managing calibration data for sensors used to obtain weather information is provided. According to an embodiment, the calibration method comprises obtaining a measured value of a weather-related parameter using a weather station and a reference devices method.

ASPECTS

According to an aspect, a reference devices system (720) for generating and managing calibration data for sensors used to obtain weather information comprises a plurality of reference devices, wherein a reference device (110) of the plurality of reference devices is configured to be calibrated against a weather station (115) and to serve as a calibration reference for a community device (130).

Preferably, the reference device (110) of the plurality of reference devices is one of a mobile reference device (110m) and stationary reference device (110s).

Preferably, the reference device (110) of the plurality of reference devices is configured to receive one of an offset value and a measured value of a weather-related parameter from the weather station (115).

Preferably, the reference device (110) of the plurality of reference devices is configured to one of transmit location information of the reference device (110) and receive location information of the weather station (115) to determine if the reference device (110) can be calibrated against the weather station (115).

Preferably, the reference device (110) of the plurality of reference devices is configured to one of transmit location information of the reference device (110) and receive location information of the community device (130) to determine if the community device (130) can be calibrated against the reference device (110).

Preferably, the reference devices system (720) further comprises a calibration server (120), the calibration server (120) being configured to execute at least one of a triggering algorithm and a calibration algorithm.

Preferably, the calibration server (120) being configured to execute the triggering algorithm comprises the calibration server (120) being configured to receive location information of the reference device (110) and receive location information of the community device (130) and determine if the reference device (110) and the community device (130) are within a calibration distance threshold.

Preferably, the calibration server (120) being configured to execute the calibration algorithm comprises the calibration server (120) being configured to obtain a measured value determined by the reference device (110) measuring the of a weather-related parameter, obtain a measured value determined by the community device (130) measuring the weather-related parameter, and determine an offset value based on a comparison of the measured value determined by the reference device and the measured value determined by the community device (130).

According to an aspect, a reference devices method for generating and managing calibration data for sensors used to obtain weather information comprises providing one or more reference devices, calibrating the one or more reference devices against a weather station, and configuring the one or more reference devices to serve as a calibration reference for a community device.

Preferably, providing the one or more reference devices comprises providing at least one of a mobile reference device and a stationary reference device.

Preferably, the reference devices method further comprises receiving one of an offset value and a measured value of a weather-related parameter measured by the weather station.

Preferably, the reference devices method further comprises at least one of transmitting location information of the one or more reference devices and receiving location information of the weather station to determine if the one or more reference devices can be calibrated against the weather station.

Preferably, the reference devices method further comprises at least one of transmitting location information of the reference device and receiving location information of the community device to determine if the community device can be calibrated against the reference device.

Preferably, the reference devices method further comprises providing and configuring a calibration server to execute at least one of a triggering algorithm and a calibration algorithm to calibrate the community device against the one or more reference devices.

Preferably, configuring the calibration server to execute the triggering algorithm comprises configuring the calibration server to receive location information of the reference device and receive location information of the community device and determine if the reference device and the community device are within a calibration distance threshold.

Preferably, configuring the calibration server to execute the calibration algorithm comprises configuring the calibration server to obtain a measured value determined by the reference device measuring the of a weather-related parameter, obtain a measured value determined by the community device measuring the weather-related parameter, and determine an offset value based on a comparison of the measured value determined by the reference device and the measured value determined by the community device.

According to an aspect, a calibration data system (740) for generating and managing calibration data for sensors used to obtain weather information comprises a calibration server (120) configured to determine a calibration hierarchy position of a weather station (115), a reference device (110) configured to be calibrated against the weather station (115), and a community device (130) configured to be calibrated against the reference device (110).

Preferably, the calibration server (120) is further configured to at least one of calibrate the reference device (110) against the weather station (115) and calibrate the community device against the reference device (110).

Preferably, the calibration server (120) is further configured to store a sensor calibration hierarchy (500) of the weather station (115), the reference device (110), and the community device (130).

Preferably, the sensor calibration hierarchy (500) further comprises a calibration sub-hierarchy of at least one of fixed weather stations (510), reference devices (520), and community devices (530).

Preferably, the calibration server (120) is further configured to store and process a sensor schema of a sensor in the reference device (110).

Preferably, the calibration server (120) being configured to process the sensor schema of the sensor in the reference device (110) comprises storing calibration data determined by calibrating the reference device (110) against the weather station (115) in the sensor schema.

Preferably, the calibration server (120) is further configured to store and process a sensor schema of a sensor in the community device (130).

According to an aspect, a calibration data method for generating and managing calibration data for sensors used to obtain weather information comprises determining a calibration hierarchy position of a weather station, a reference device configured to be calibrated against the weather station, and a calibration hierarchy position of a community device configured to be calibrated against the reference device.

Preferably, the calibration data method further comprises calibrating the reference device against the weather station and calibrating the community device against the reference device.

Preferably, the calibration data method further comprises storing a sensor calibration hierarchy having a calibration hierarchy of the weather station, the reference device, and the community device.

Preferably, the sensor calibration hierarchy further comprises a calibration sub-hierarchy of at least one of weather stations, reference devices, and community devices.

Preferably, the calibration data method further comprises storing and processing a sensor schema of a sensor in the reference device.

Preferably, processing the sensor schema of the sensor in the reference device comprises storing calibration data determined by calibrating the reference device against the weather station in the sensor schema.

Preferably, the calibration data method further comprises storing and processing a sensor schema of a sensor in the community device.

According to an aspect, a calibration triggering system (750) for generating and managing calibration data for sensors used to obtain weather information comprises a calibration server (120) configured to determine a distance between a reference device (110) and a community device (130), compare the distance to a calibration distance threshold between the reference device (110) and the community device (130), wherein the reference device (110) is calibrated against a weather station (115).

Preferably, the calibration server (120) is further configured to determine if the reference device (110) and the community device (130) are within the calibration distance threshold for a predetermined time-interval.

Preferably, wherein the calibration server (120) being configured to determine a distance between the reference device (110) and the community device (130) comprises the calibration server (120) being configured to receive and compare location information of the reference device (110) and location information of the community device (130).

Preferably, the location information of the reference device (110) is provided by the reference device and the location information of the community device (130) is provided by the community device (130).

Preferably, the calibration server (120) is further configured to determine if a sensor of the reference device (110) is a calibration reference to a sensor of the community device (130).

Preferably, the calibration server (120) is further configured to store and process a calibration triggering algorithm to determine the distance between the reference device (110) and the community device (130).

According to an aspect, a calibration triggering method for generating and managing calibration data for sensors used to obtain weather information comprises determining a distance between a reference device and a community device, and comparing the distance to a calibration distance threshold between the reference device and the community device, wherein the reference device is calibrated against a weather station.

Preferably, the calibration triggering method further comprises determining if the reference device and the community device are within the calibration distance threshold for a predetermined time-interval.

Preferably, determining the distance between the reference device and the community device comprises receiving and comparing location information of the reference device and location information of the community device.

Preferably, the location information of the reference device is provided by the reference device and the location information of the community device is provided by the community device.

Preferably, the calibration triggering method further comprises determining if a sensor of the reference device is a calibration reference to a sensor of the community device.

Preferably, the calibration triggering method further comprises to storing and processing a calibration triggering algorithm to determine the distance between the reference device and the community device.

According to an aspect, a calibration system (700) for generating and managing calibration data for sensors used to obtain weather information comprises a weather station (710) and a reference devices system (720).

Preferably, the calibration system (700) further comprises a calibration data system (740).

Preferably, the calibration system (700) further comprises a calibration triggering system (750).

Preferably, the calibration system (700) further comprises a plurality of community devices (730), wherein at least one of the plurality of community devices (730) is configured to be calibrated against a reference device of the reference devices system (720).

According to an aspect, a calibration method for generating and managing calibration data for sensors used to obtain weather information comprises obtaining a measured value of a weather-related parameter using a weather station and a reference devices method.

Preferably, the calibration method further comprises a calibration data method.

Preferably, the calibration method further comprises a calibration triggering method.

Preferably, the calibration method further comprises calibrating least one of a plurality of community devices against a reference device.

BRIEF DESCRIPTION OF THE DRAWINGS

The same reference number represents the same element on all drawings. It should be understood that the drawings are not necessarily to scale.

FIG. 6 shows a sensor schema 600 for generating and managing calibration data for sensors used to obtain weather information.

DETAILED DESCRIPTION

FIGS. 1-12 and the following description depict specific examples to teach those skilled in the art how to make and use the best mode of embodiments of generating and managing calibration data for sensors used to obtain weather information. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of generating and managing calibration data for sensors used to obtain weather information. As a result, the embodiments described below are not limited to the specific examples described below, but only by the claims and their equivalents.

Figure 1:
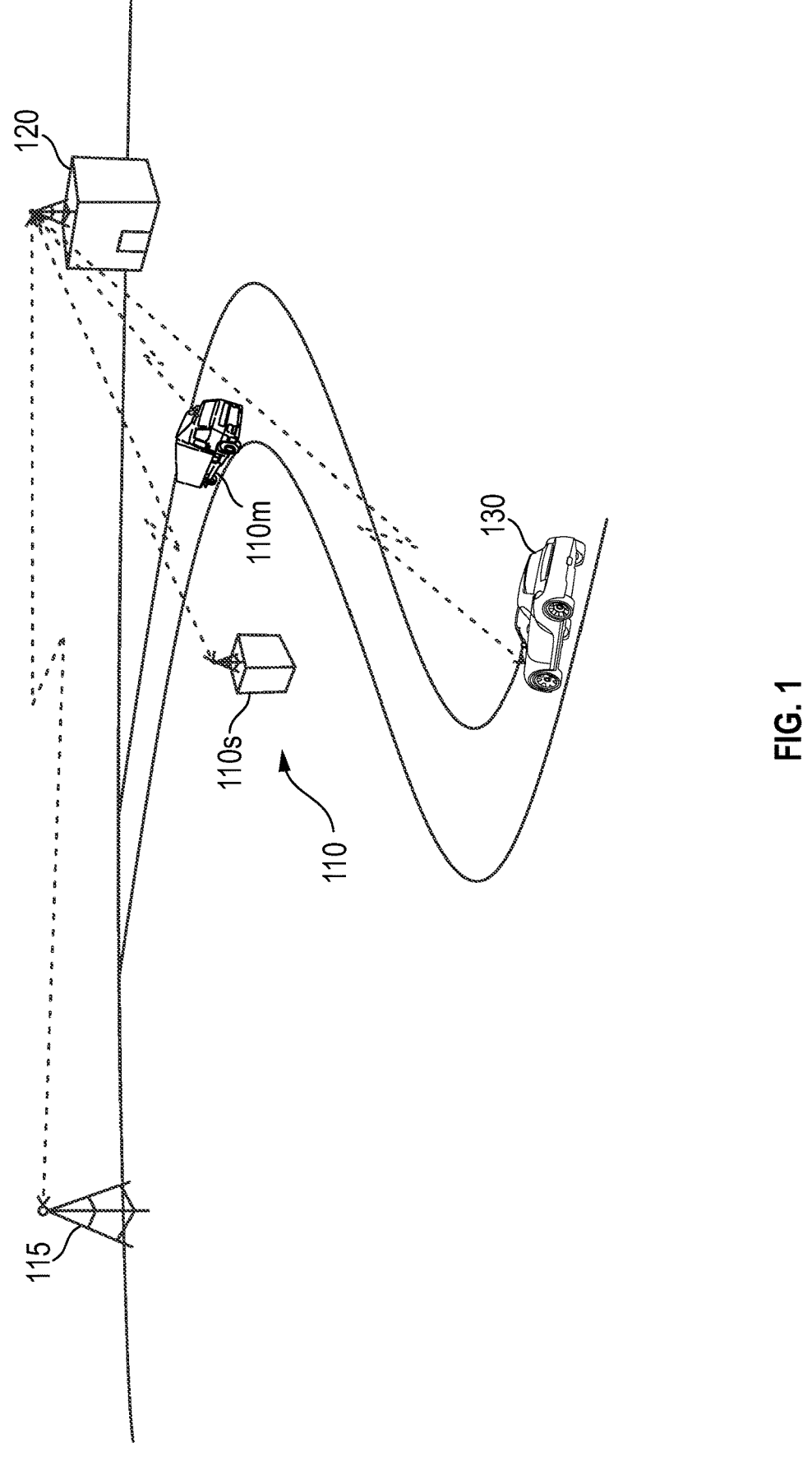
FIG. 1 shows a calibration system 100 for generating and managing calibration data for sensors used to obtain weather information.

FIG. 1 shows a calibration system 100 for generating and managing calibration data for sensors used to obtain weather information. As shown in FIG. 1, the calibration system 100 includes reference devices 110, a weather station 115, and a calibration server 120. The reference devices 110 includes a stationary reference device 110s and a mobile reference device 110m. As shown in FIG. 1, the reference devices 110 and the calibration server 120 are communicatively coupled with each other. Also shown is a community device 130 that is communicatively coupled to the calibration server 120. The community device 130 is shown as a vehicle, which may have weather sensors or weather inferential sensors.

The reference devices 110 include the stationary reference device 110s and the mobile reference device 110m. The stationary reference device 110s and the mobile reference device 110m may be calibrated to the weather station 115. More specifically, the reference devices 110 may be or have been spatiotemporally proximate to the weather station 115 such that weather data provided by the reference devices 110 and the weather station 115 is expected to be the same. For example, the mobile reference device 110m may have been within a reference device calibration distance threshold for a reference device calibration time threshold sufficient to assume that a weather measurement by the mobile reference device 110m should be the same as the weather measurement by the weather station 115. Accordingly, an offset value may be set in the mobile reference device 110m to ensure that the weather measurement provided by the mobile reference device 110m is the same as the weather station 115. Similarly, the stationary reference device 110s may be spatially proximate to the weather station 115 such that a similar reference device calibration of the stationary reference device 110s may be performed. As will be described in more detail in the following, the reference devices 110 may be configured to calibrate the community devices 130.

The mobile reference devices 110m may be vehicles whose primary purpose is to serve a reference or a non-reference device function. For example, the mobile reference devices 110m may be a fleet of delivery trucks whose primary purpose is to deliver packages. The fleet of delivery trucks may be retrofitted with commercial grade weather measurement systems than can be used to calibrate the community devices. For example, the mobile reference devices 110m may include temperature sensors that can measure temperatures of the road, ambient air, humidity, rainfall rate, or the like, with an accuracy and precision.

Other mobile devices with alternative primary purposes may be used, such as ride sharing vehicles, mapping or delivery drones, public services vehicles, etc. Additionally or alternatively, the mobile reference devices 110m may include devices whose primary purpose is to serve as a reference device for the community devices 130. For example, the mobile reference devices 110m may autonomous vehicles, drones, or the like, that are configured with the commercial grade weather measurement systems that can accurately measure the weather-related parameters.

The stationary reference devices 110s may be road weather stations (RWS), although any suitable stationary reference device may be employed. The stationary reference devices 110s may be installed on poles proximate to a road, such as on the side of the road. The stationary reference devices 110s may be configured with a plurality of sensors that are configured to measure a plurality of weather-related parameters. For example, the stationary reference devices 110s may include optical sensors can detect water, ice, snow deposits on the road, temperature sensors that can measure temperatures of the road, ambient air, humidity, rainfall rate, etc.

The weather station 115 may be a meteorological station that is placed at an airport, although any suitable weather station that is capable of providing measured values of weather-related parameters with an accuracy and precision that is suitable for commercial consumption may be employed. For example, the weather station 115 may be meteorological aerodrome reporting (METARs) sites at airports that provide temperature, dew point, wind direction and speed, and barometric pressure. The weather station 115 may be configured to provide a weather report on request, due to special conditions, such as rapidly changing weather conditions, and/or at predetermined times.

The weather station 115 may be institutionally validated as providing accurate measurements of weather-related parameters. For example, the weather station 115 may be calibrated against a standard that is not part of the calibration system 100. By way of illustration, the Federal Aviation Administration (FAA) may require that METAR stations be calibrated against collocated National Institutes of Standards and Technology (NIST) traceable calibrated equipment. Accordingly, the weather station 115 may be calibrated against standards traceable equipment, although any suitable quality standard may be employed. For example, the weather station 115 may be recognized in the weather industry, or other weather information reliant industry, as providing measured values of weather-related parameters that are of higher quality than measured values provided by the reference devices 110.

The calibration server 120 may be configured to host, manage, process, send/receive, or the like, calibration related information. For example, the calibration server 120 may be configured to host a sensor calibration schema that may be associated with a sensor in one of the reference devices 110. Additionally or alternatively, the calibration server 120 may be configured to manage the sensor calibration schema that is stored in one or more of the reference devices 110. For example, the reference devices 110 may be configured with distributed storage that can store one or more calibration schemas of sensors in the reference devices.

The calibration server 120 may also be configured to host, manage, process, send/receive, or the like, a calibration triggering algorithm. For example, the calibration server 120 may be configured to receive location information, such as coordinates, of the reference devices 110 and/or the community devices 130, determine that the reference devices 110 and the community devices 130 are within a calibration distance threshold, and issue a command causing a calibration of a community device 130 against a reference device 110.

The community device 130 is shown as a vehicle, but any suitable device may be employed. For example, other community devices may include cell phones, personal digital assistants, home weather monitoring stations, commercial radios, etc. As mentioned above, the community device 130 may include sensors that may be comprised or weather sensors and/or weather inferential sensors. The weather sensors may be configured to measure a weather-related parameter. For example, the community device 130 may include a temperature sensor that measures a temperature external to the community device 130. Other weather sensors may be employed, such as humidity, precipitation, light, etc., sensors.

The weather inferential sensors may be any sensor providing measured values of a weather-related parameter by inference. For example, precipitation rates may be inferred from a vehicle's windshield wiper frequency. As can be appreciated, the data obtained from the weather sensors or weather inferential sensors may be obtained, processed, combined, and/or analyzed in any suitable manner to obtain weather-related data. For example, weather-related data from a light sensor may be analyzed with weather-related data inferred from the windshield wiper to obtain, for example, cloud coverage data.

The community device may also include other sensors that do not measure a weather-related parameter but can be used to improve measurements of the weather-related parameter. For example, the community device may include a proximity sensor, accelerometer, magnetometer, or the like that can be used to determine a context of a measurement. By way of illustration, a proximity sensor could be used to determine that the community device is placed in a pocket and therefore, measured values of a light sensor may be flagged as not measuring a weather-related parameter.

The community device sensors may or may not accurately measure the weather-related parameters. To ensure accurate measurements of the weather-related parameter, the community devices 130 may be calibrated against the reference devices 110 ensure that the community device sensors can provide accurate measurements of the weather-related parameters. A measured value of a weather-related parameter may be corrected by an offset value that is determined during a calibration by using equation [1] below:

$$z_i(t) = \theta + w_i(t); \qquad [1]$$

where:
  $z_i(t)$ is the measured value provide by sensor of a community device 130;
  $\theta$ is the value that we want to estimate (believed "true" value) of a weather-related parameter, which is typically a reference value determined by a reference device 110; and
  $w_i(t)$ is an offset value that corrects the measured value $z_i(t)$ of the community device.

However, the measured value of the weather-related parameter may be also be corrected with a gain as follows:

$$z_i(t) = H_i\theta + w_i(t); \qquad [2]$$

where:
  $H_i$ is a gain of a system.

Ideally, where the sensor of the community device 130 is providing perfectly accurate measured values, the gain $H_i$ has a value of "1" and the offset value $w_i(t)$ is "0". To address the use case of the community device 130—the use case being the surrounding environment, user activity, sensor limitations, or the like, we can rely on the other community devices. There are various ways of addressing the use case of the community device 130. However, by way of illustration, a gossip algorithm may be employed that may be defined by:

$$x(t+1) = W(t)x(t); \qquad [3]$$

where:
  $W(t)$ is a random weight matrix;
  $x(t)$ is a current value of a node in a network; and
  $x(t+1)$ is an estimated value of a network.

As can be appreciated, each community device 130 may be a node on a network of community devices 130. Gossip algorithms may be used to estimate a value in a network by distributed averaging.

A pairwise gossip algorithm can be formulated to adjust and update a measured value determined by a sensor in a community device 130:

$$x(t+1) = W_\alpha\theta_i(t) + W_\beta x_i(t); \qquad [4]$$

where:
  $x_i(t)$ is a measured value of a sensor of a community device 130;
  $x(t+1)$ is an updated or corrected measured value of a weather-related parameter;
  $W_\alpha\theta_i(t)$ is a reference value $\theta$ provided by a reference device 110 for some gain ratio $W_\alpha$; and
  $W_\beta x_i(t)$ is some ratio $W_\beta$ based on a variance of $x_i(t)$ and an actual difference of $x_i(t)$ from $\theta$.

Although the above illustrates an exemplary calibration method, any suitable calibration method may be employed.

Figure 2:
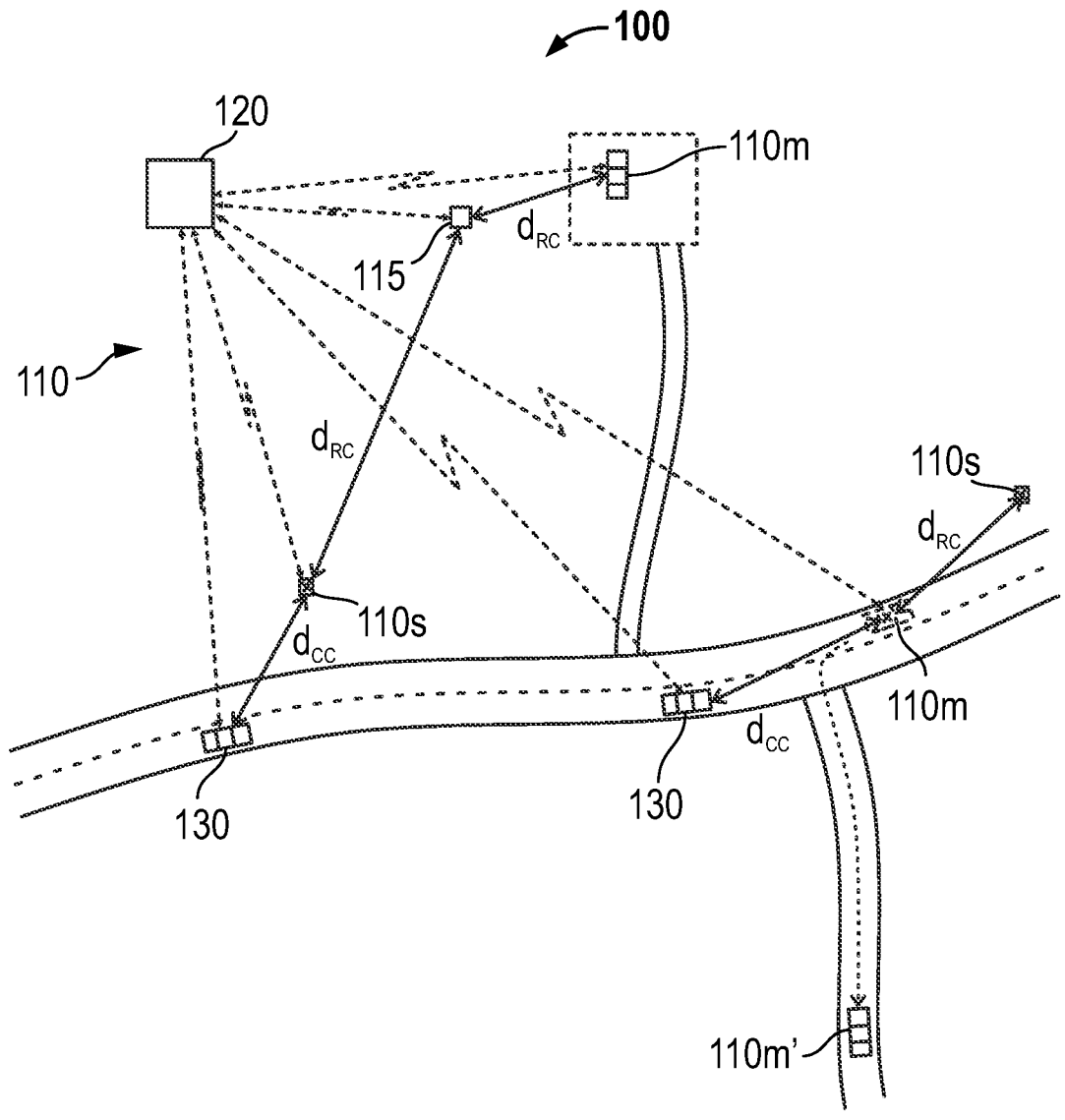
FIG. 2 shows the calibration system 100 for generating and managing calibration data for sensors used to obtain weather information.

FIG. 2 shows the calibration system 100 for generating and managing calibration data for sensors used to obtain weather information. As shown in FIG. 2, the calibration system 100 includes the reference devices 110, which are illustrated as including the mobile reference devices 110$m$ and the stationary reference device 110$s$. Also shown is a weather station 115 that is used to calibrate one of the mobile reference devices 110$m$ and the stationary reference device 110$s$. The mobile reference devices 110$m$, the stationary reference device 110$s$, and the weather station 115 are communicatively coupled with the calibration server 120. Also shown are community devices 130 illustrated as vehicles. The community devices 130 are in communication with the calibration server 120.

The reference devices 110 are shown as being at reference device calibration distances $d_{RC}$ from the weather station 115, which are illustrated as arrows. The reference device calibration distances $d_{RC}$ may be less than a reference device calibration distance threshold and therefore the reference devices 110 may be calibrated relative to the weather station 115. For example, as can be seen, one of the mobile reference devices 110$m$ is proximate the weather station 115 and therefore may be calibrated relative to the weather station 115. As illustrated, the mobile reference device 110$m$ that is being calibrated relative to the weather station 115 is disposed in a parking lot that may, for example, be at an airport. Accordingly, the weather station 115 may be the airport's weather monitoring station and therefore may be configured to accurately measure weather-related parameters.

The community devices 130 are shown as being at community device calibration distances dcc, which may be less than a community device calibration distance threshold. Accordingly, the community devices 130 may be calibrated relative to the reference devices 110. One of the community devices 130 is proximate the stationary reference device 110$s$ and another of the community devices 130 is proximate one of the mobile reference devices 110$m$. As can be seen, the community device 130 that is proximate the stationary reference device 110$s$ is passing by the stationary reference device 110$s$ and therefore may have a relatively short community device calibration time that may nevertheless be less than the community device calibration time threshold.

As can also be seen, the community device 130 proximate the mobile reference device 110$m$ is traveling along the same path in the opposite direction as the mobile reference device 110$m$. The mobile reference device 110$m$ may measure a weather-related parameter at the location marked by an "x". The measured value may be tagged by location data such as global positioning system (GPS) coordinates and a timestamp. This measured value obtained at the location marked by the "x" may be used to calibrate the community device 130 proximate the mobile reference device 110*m* if the community device calibration distance dcc of community device 130 is within the community device calibration distance threshold for less than the community device calibration time threshold. However, any suitable means of determining if the mobile reference device 110*m* is spatiotemporal proximate the community device 130 may be employed.

As can also be seen in FIG. 2, a second stationary reference device 110*s* is proximate the mobile reference device 110*m* that is proximate the community device 130. The second stationary reference device 110*s* is shown as not being within a reference device calibration distance threshold of the weather station 115 but is spatiotemporal proximate the mobile reference device 110*m*. Accordingly, the stationary reference device 110*s* may be calibrated against the mobile reference device 110*m* if the mobile reference device 110*m* is higher in a sensor calibration hierarchy than the stationary reference device 110*s*.

A calibration device pair may be formed by a reference device 110 and a community device 130, two reference devices 110, or a reference device 110 and a community device are spatiotemporal proximate. The calibration device pair may be spatiotemporal proximate if a calibration distance and a calibration time between the calibration device pair are less than a respective calibration distance threshold and a calibration duration threshold. The calibration distance threshold and calibration duration threshold may collectively be referred to as a calibration threshold or a spatiotemporal threshold.

This spatiotemporal threshold may be variable-dependent. For example, one may choose to use a different spatiotemporal threshold value for temperature as compared to precipitation. This difference may be due to a tendency for temperature generally not varying as much as precipitation over a time-period. The threshold may be determined from weather-related data. In other words, an analysis could be completed that determines a spatial correlation distance and a temporal correlation time. Spatiotemporal values could depend on location, time, or both. For example, a temporal threshold for precipitation might be shorter in summer (e.g., 15 minutes) than in winter (e.g., 30 minutes) because precipitation may have more temporal variability during the summer, which may include more spurious events, such as thunderstorms. The determination of spatiotemporal thresholds could be part of a calibration algorithm. In practice, assumptions can be made if such analysis is not available. To start, we might assume a spatiotemporal threshold of +/−2 km and +/−15 min.

As will be described in more detail in the following, the systems and methods described herein include may include a network-based calibration system that opportunistically calibrates sensors of the community devices 130, which may provide lower quality measurements, against sensors of the reference devices 110, which may have higher-quality sensors, when the reference devices 110 and community devices 130 are proximate to each other. The systems and methods may track and manage calibration quality to ensure that the process improves rather than degrades calibration of any individual device. The systems and methods may include five elements: (1) a calibration system hierarchy, (2)

a sensor calibration schema, (3) a calibration triggering, (4) a calibration algorithm, and (5) calibration information management.

Figure 3:
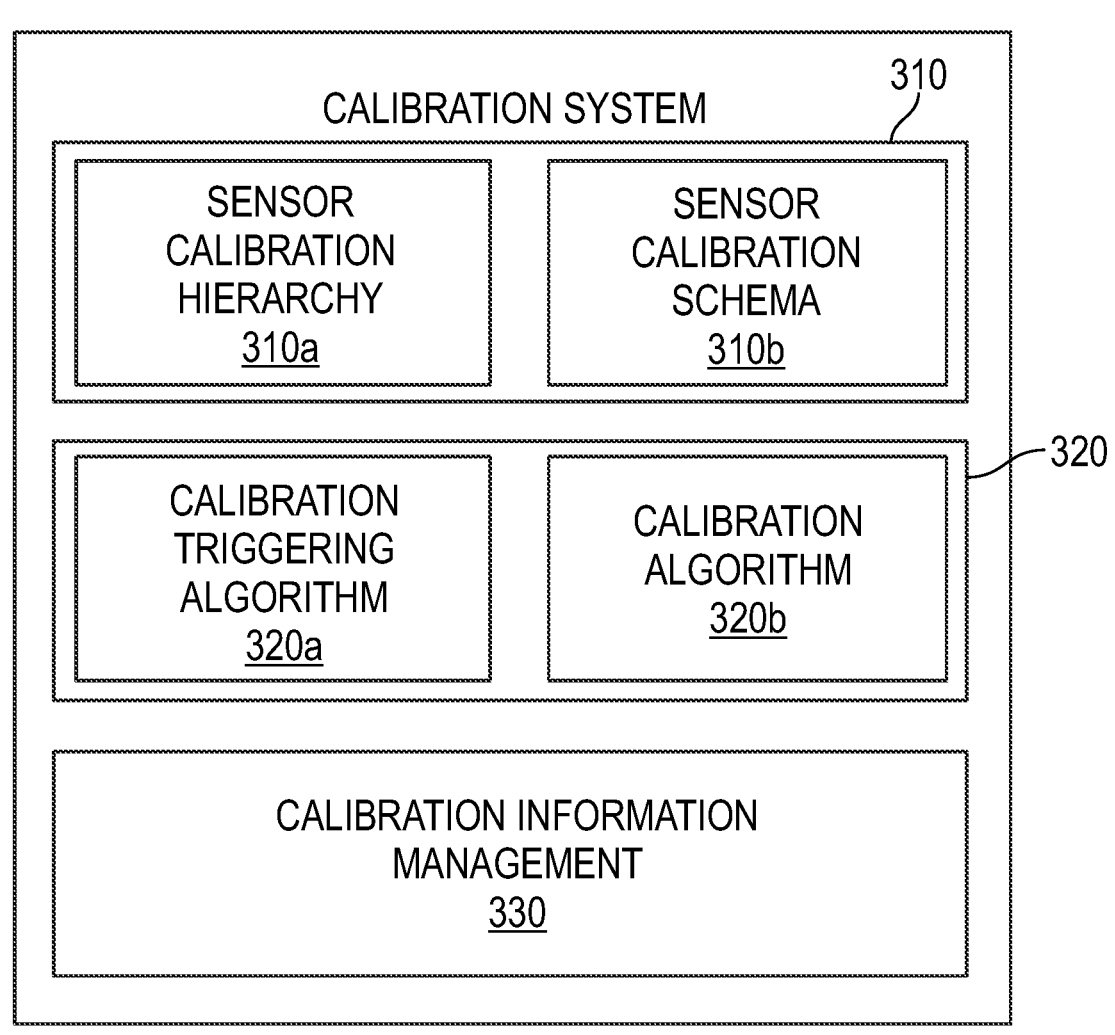
FIG. 3 shows a calibration system 300 for generating and managing calibration data for sensors used to obtain weather information.

FIG. 3 shows a calibration system 300 for generating and managing calibration data for sensors used to obtain weather information. As shown in FIG. 3, the calibration system 300 is comprised of a calibration data system 310 and a calibration execution system 320. Also shown is a calibration information management system 330. The calibration data system 310 is comprised of a sensor calibration hierarchy 310*a* and a sensor calibration schema 310*b*. The calibration execution system 320 is comprised of a calibration triggering algorithm 320*a* and a calibration algorithm 320*b*.

The calibration system 300 is shown as a single block, which may represent computing resources of servers, devices, network routers, etc. For example, the calibration system 300 may be implemented on a single hardware platform and/or across various hardware platforms by using, for example, cloud computing resources, file and process sharing, virtual operating systems, such as secured virtual machines, that operate on devices, such as the reference devices 110 or community devices 130 described above.

By way of illustration, the calibration server 120 described above with reference to FIGS. 1 and 2 may be implemented using cloud services that includes only the sensor calibration hierarchy 310*a* and the sensor calibration schema 310*b* whereas the calibration triggering algorithm 320*a* and the calibration algorithm 320*b* may be implemented by a distributed virtual machine that operates on the reference devices 110. In this example, the calibration information management system 330 may be hosted in the cloud with the sensor calibration hierarchy 310*a* and sensor calibration schema 310*b*. However, any suitable configuration of the calibration system 300, as well as the other systems and methods described herein may be employed. An exemplary calibration server 120 is described in more detail in the following with reference to FIG. 11.

The sensor calibration hierarchy 310*a* may include a calibration hierarchy that includes a calibration hierarchy position of the weather station 115, the reference devices 110, and/or the community devices 130 discussed above. For example, the sensor calibration hierarchy 310*a* may include data showing that, for example, a reference device 110 may be calibrated against a weather station 115. An exemplary sensor calibration hierarchy 310*a* is described below with reference to FIG. 5.

The sensor calibration schema 310*b* may include a data schema or structure that can store calibration related data. For example, the sensor calibration schema 310*b* may be configured to store an offset value and/or a measured value obtained from, for example, the weather station 115 and/or the reference devices 110. Other data may be stored, such as baseline error data, sensor error characterization, calibration persistence, and/or calibration history, or the like. An exemplary sensor calibration is described below with reference to FIG. 6.

The calibration execution system 320 may be configured to determine that a community device 130 can be calibrated against a reference device 110 and perform the calibration of the community device 130 against the reference device 110. For example, the calibration triggering algorithm 320*a* may cause a calibration to be performed on the community device 130 due to the community device 130 being within a calibration distance threshold of the reference device 110. The calibration triggering algorithm 320*a* may call or cause the calibration algorithm 320*b* to execute.

The calibration algorithm 320*b* may perform a calibration between a standard device and a measurement device. The standard device may be a reference device 110 of the reference devices 110 described above and the measurement device may be a community device 130. The calibration algorithm 320*b* may cause the reference device 110 to measure a weather-related parameter to obtain a measured value.

The calibration algorithm 320*b* may also cause the reference device 110 to store, provide, or otherwise process the measured value obtained from the sensor of the reference device 110. For example, the calibration algorithm 320*b* may cause the reference device 110 to store the measured value in a sensor calibration schema 310*b* stored on the reference device 110 as a standard value. Additionally or alternatively, the calibration algorithm 320*b* may cause the reference device 110 to provide the measured value of the weather-related parameter to, for example, the calibration server 120 and/or the community device 130.

The calibration algorithm 320*b* may determine, for example, an offset value that can be used to adjust a measured value obtained from a sensor of the community device 130. For example, the community device 130 may measure the same weather-related parameter measured by the sensor of the reference device 110. By way of illustration, the reference device 110 and the community device 130 may be within the calibration distance threshold as discussed above and therefore may perform measurements of essentially the same weather phenomenon.

The calibration algorithm 320*b* may compare the measured value obtained by the sensor of the community device 130 to the measured value obtained by the sensor of the reference device 110. The calibration algorithm 320*b* may then determine an offset necessary to ensure that the measured value obtained by the sensor of the community device 130 is the same as the measured value obtained by the sensor of the reference device 110.

Figure 4:
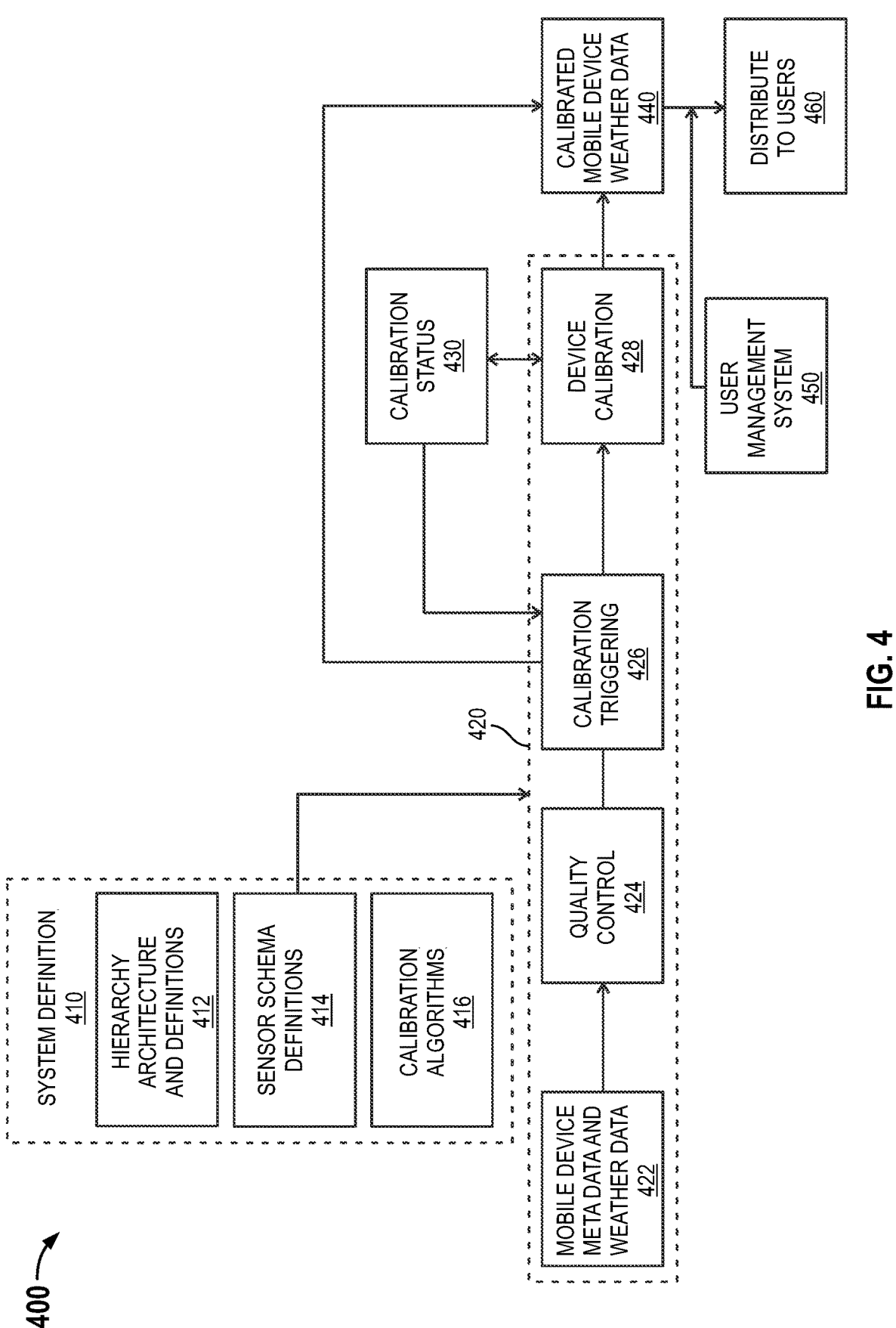
FIG. 4 shows a calibration system 400 for generating and managing calibration data for sensors used to obtain weather information.

FIG. 4 shows a calibration system 400 for generating and managing calibration data for sensors used to obtain weather information. As shown in FIG. 4, the calibration system 400 includes a system definition 410, which may be a non-real time system, and a real-time calibration system 420 that is in communication with the system definition 410. The calibration system 400 also includes a device calibration status 430, which is in communication with the real-time calibration system 420 and a calibrated mobile device weather data 440. The calibrated mobile device weather data 440 is in communication with a user management system 450 and a distribute to users 460 function. The system definition 410 is shown as including hierarchy architecture and definitions 412, sensor schema definitions 414, and calibration algorithms 416. The real-time calibration system 420 includes mobile device meta data and weather data 422, quality control 424, calibration triggering 426, and device calibration 428.

The hierarchy architecture and definitions 412 may ensure that calibration adjustments are passed from one sensor or set of sensors to another only when calibration would improve as a result. The hierarchy architecture and definitions 412 can be implemented in a variety of ways. By way of example, and as is shown in FIG. 5, the hierarchy architecture and definitions 412 may be a nested sensor calibration hierarchy 500.

Figure 5:
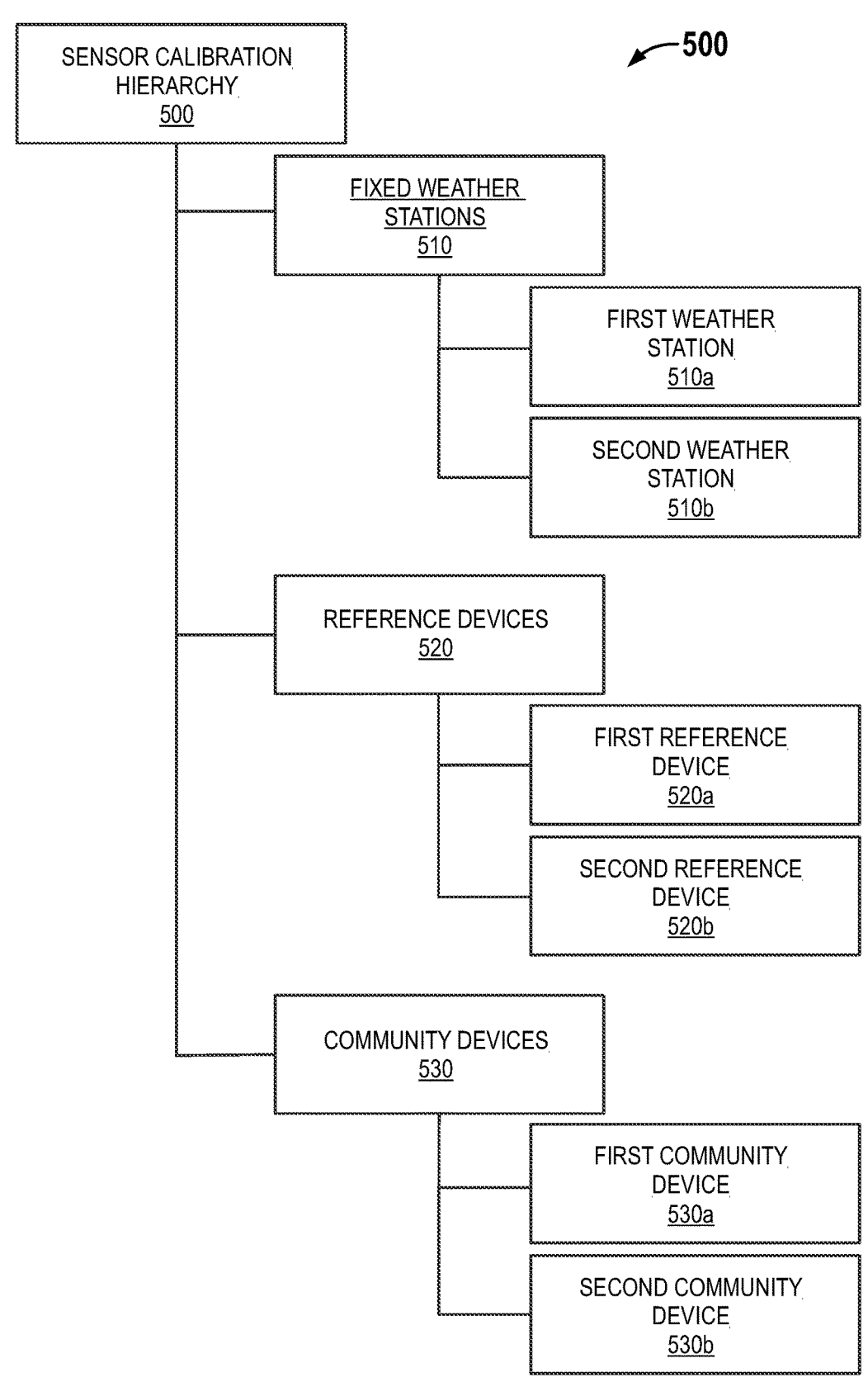
FIG. 5 shows a sensor calibration hierarchy 500 for generating and managing calibration data for sensors used to obtain weather information.

FIG. 5 shows a sensor calibration hierarchy 500 for generating and managing calibration data for sensors used to obtain weather information. At a top level of the nested sensor calibration hierarchy 500, devices be characterized in one of three categories: fixed weather stations 510, reference devices 520, and community devices 530.

The fixed weather stations 510 may be the weather station 115 discussed above, such as a METAR weather stations located at airports. The METAR weather stations may be considered one of the highest quality weather stations available and are themselves independently calibrated. High quality may include high accuracy and precision as well as high resolution and dynamic range of weather data.

The reference devices 520 may be dedicated devices fielded and maintained to enable the calibration system. For example, a fleet of commercial vehicles, such as the mobile reference devices 110*m* described above, could be configured to include professional-quality weather sensors. This fleet could be substantially smaller than the number of community devices in need of calibration but may play a critical role in transferring calibration from the fixed weather stations 510 to the community devices 530.

The community devices 530 may be the community devices 130 described above, which may be vehicles or mobile phones with sensors capable of measuring some aspect of weather, as is described above. The sensors in the community devices 530 may include weather sensors or inferential weather sensors.

The calibration system may need to properly define the hierarchy elements, and each device in the calibration system would need to be assigned into the appropriate hierarchy level. Within each of these three categories, further hierarchies are possible, such as sub-hierarchies shown in FIG. 5. For example, the fixed weather station category could have a sub-hierarchy subdivided into highest-quality, such as the first weather station 510*a*, which would include most airport and weather service weather stations, and high-quality, such as the second weather station 510*b*, which would include other weather stations established by organizations dedicated to maintaining quality observations. Such subdivision can even be extended to ranking the quality of each device against all others so that every device has a unique hierarchy ranking, but this may not be necessary for proper operation of the system. Similar subdivisions of the sensor calibration hierarchy 500 may be used, such as a first reference device 520*a* and a second reference device 520*b* of the reference devices 520 and a first community device 530*a* and a second community device 530*b* of the community devices 530.

Referring again to FIG. 4, the sensor schema definitions 414 may define the characteristics of each sensor that need to be understood and shared within the system. The sensor schema definition 414 may be flexible but may be implemented according to FIG. 6.

FIG. 6 shows a sensor schema 600 for generating and managing calibration data for sensors used to obtain weather information. As shown in FIG. 6, a sensor schema 600 may include a baseline sensor error characterization 610, a computed sensor error characterization 620, a calibration persistence 630, and calibration history 640.

The baseline sensor error characterization 610 may be a standard estimate of a sensor's accuracy, potentially provided by the sensor or device manufacturer or established within this system as an initial assumption when more reliable information is not available. Particular metrics of the baseline sensor error characterization 610 might include such things as bias and standard deviation.

The computed sensor error characterization 620 may be a calibration system estimate of the sensor error. Particular metrics might include such things as bias and standard deviation.

The calibration persistence 630 may be an estimate of the time duration over which a calibration estimate remains valid. For example, a reliable estimate of a sensor bias made within the last hour may be useful but one from six months ago may be obsolete. In general, the current calibration of any sensor should trend from its most recent computed value toward to the baseline value over the persistence time. The persistence time may be a fixed characteristic of the sensor or may be computed from the calibration history. The calibration history 640 may be the history of the sensor calibration. In practice, it may include only the recent history.

Referring again to FIG. 4, the calibration algorithms 416 may include algorithms for triggering calibration and for performing calibration. As shown in FIG. 4, the calibration triggering 426 and the device calibration 428 may be performed by the real-time calibration system 420. The calibration triggering 426 may determine, by implementing a calibration triggering algorithm of the calibration algorithms 416, from among all possible weather measurements made by a sensor on a device, if and when a calibration should be initiated. For example, a calibration may be triggered if two or more devices are located within some predetermined distance of each other during some predetermined interval and one device has sufficiently better calibration (e.g., higher in the hierarchy) than the other that a calibration will be effective. A more complex algorithm may include the need for calibration, based on a comparison between the time since last calibration and the calibration persistence value for that sensor. Such information may be provided by the device calibration status 430. It may also consider the benefit of a calibration, such as if the calibration would involve comparison with a device/sensor considerably higher in the hierarchy.

Once triggered, the device calibration 428 may be performed. The device calibration 428 may be exemplified by but not limited to: a) device pairs, b) localized device groups, and c) system-wide. There may be desirable approaches that properly address these issues. For example, the calibration system 400 may be designed so that calibration of individuals sensors converges such that the calibration improves in a reliable manner. When not done carefully, for example, it is possible to compute a bias adjustment for a particular sensor that, when applied to adjust the sensor observation, makes the adjusted observation less accurate. Loven L. Karsisto, et al., *Mobile Road Weather Sensor Calibration by Sensor Fusion and Linear Mixed Models*, PLoS ONE 14(2) e0211702 (Published Feb. 7, 2019) and Jane Louie Fresco Zamora, et al., *Calibration of Smartphone-Based Weather Measurements Using Pairwise Gossip*, Hindwai Publishing Corporation, vol. 2105, art. id. 494687 (Accepted Jan. 28, 2015), which are incorporated in their entirety by reference, show that effective methods for individual pairwise calibration are feasible.

The particular calibration algorithm used will depend on the details of the desired calibration situation, so that multiple calibration algorithms may be employed to accommodate different situations. The algorithms may be convergent and stable in real-world situations by using computational methods such as gradient descent and Kalman filtering employing a recent history of calibration for each device. For this reason, a schema may be structured to maintain critical information such as the calibration history and the calibration persistence time.

A fifth aspect is how and where the information about calibration may be maintained and communicated. Two options are: a) in a centralized (or even partially distributed)

information system, and b) in the devices. In practice, devices that are not designed to store or use calibration information may not be modifiable to do so. A centralized information may be the most feasible from an economic and/or technical standpoint. This centralized information system would perform all management/operations functions needed for the calibration process: a) hierarchy management/operations, b) schema management/operations, c) triggering management, d) processing management/operations, and e) communication management/operations. This final communication step reflects the desire to share calibrated weather information from participating devices to appropriate parties and the need to manage that communication appropriately.

Figure 7:
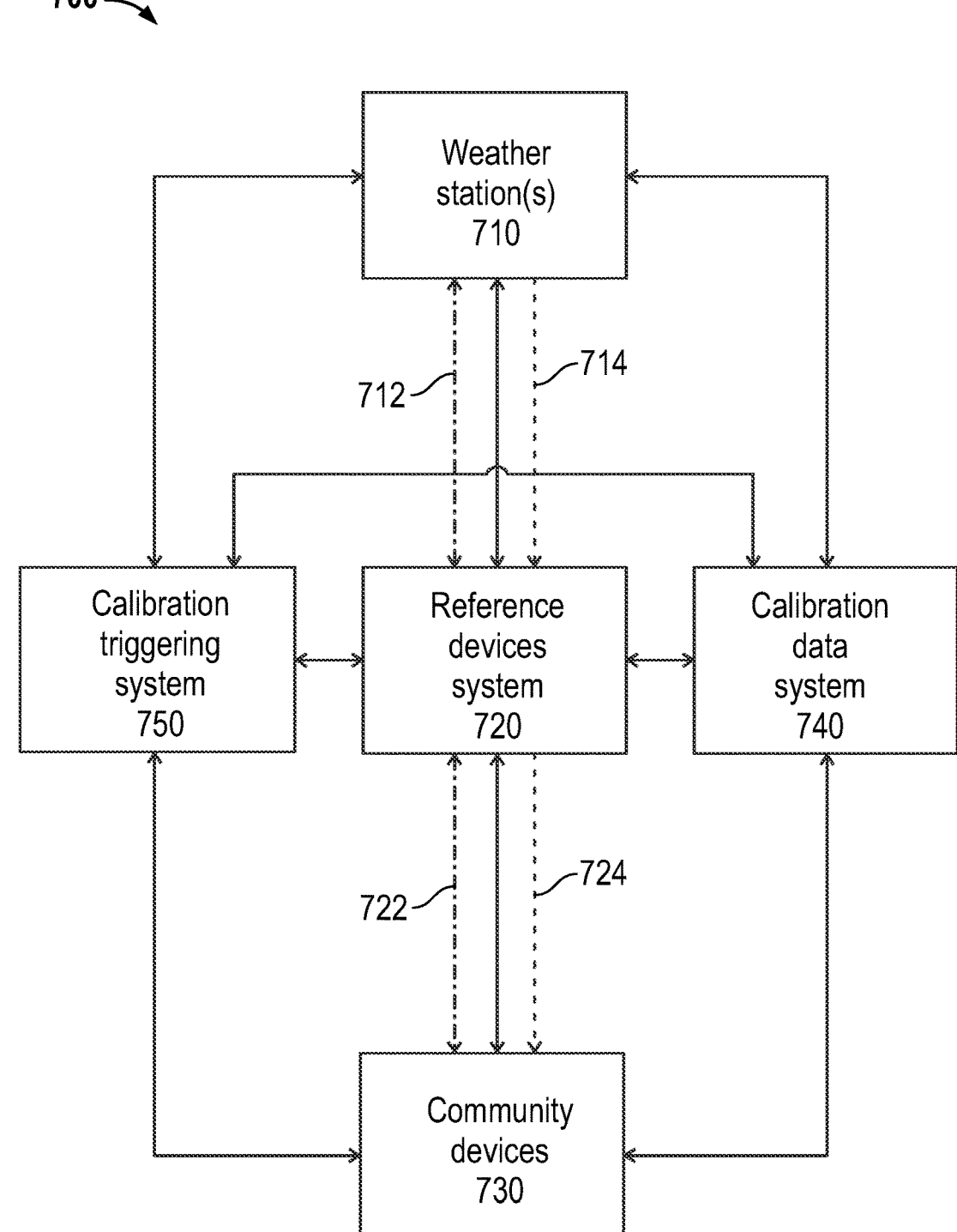
FIG. 7 shows a calibration system 700 for generating and managing calibration data for sensors used to obtain weather information.

FIG. 7 shows a calibration system 700 for generating and managing calibration data for sensors used to obtain weather information. As shown in FIG. 7, the calibration system 700 includes a weather station 710, a reference devices system 720, and community devices 730. The calibration system 700 also includes a calibration data system 740 and a calibration triggering system 750. The calibration system 700 is shown as a data relationship form to illustrate data relationships and/or flows between the weather station 710, the reference devices system 720, the community devices 730, the calibration data system 740, and the calibration triggering system 750. More specifically, possible data flows are shown as solid lines and data relationships are shown as dashed and/or dotted lines.

The weather station 710 is shown as being communicatively coupled to the reference devices system 720 by a communication line. Also shown is a weather station-reference device spatiotemporal line 712 that illustrates a calibration threshold between the weather station 710 and a reference device of the reference devices system 720. In addition, a weather station-reference device system calibration hierarchy relationship line 714 illustrates a hierarchal relationship between the weather station 710 and the reference devices system 720. As can be appreciated, the weather station-reference devices system calibration hierarchy relationship line 714 shows that the weather station 710 is higher in a calibration hierarchy scheme and therefore, reference devices of the reference devices system 720 may be calibrated against the weather station 710.

The reference devices system 720 is also shown as communicatively coupled to the community devices 730 by a communication line. Also shown is a reference devices system-community devices spatiotemporal line 722 that illustrates a calibration threshold between the reference devices system 720 and the community device 730 and a reference device system-community device calibration hierarchy relationship line 724 that illustrates a hierarchal relationship between the reference devices system 720 and the community devices 730. As can be appreciated, the reference devices system-community devices calibration hierarchy relationship line 724 shows that the reference devices system 720 is higher in a calibration hierarchy scheme and therefore, a community device of the community devices 730 may be calibrated against the reference devices system 720.

The weather station 710 may be the same as the weather station 115 described above, although any suitable weather station may be employed. The weather station 710 may be configured to measure weather-related parameters in a region at and about the weather station 710.

The reference devices system 720 may be configured to calibrate one or more reference devices, such as the reference devices 110 discussed above, against the weather station 710. The reference devices 110 may be calibrated against the weather station 710 by using a rendezvous method. More specifically, the reference devices 110 may be within a reference device calibration distance such that a sensor of the reference device 110 may be measuring substantially the same weather-related parameter as the weather station 710.

The reference devices system 720 may also optimally deploy the reference devices 110. For example, the reference devices system 720 may obtain location information and calibration data of the reference devices 110 and determine where to deploy the mobile reference devices 110*m* described above. Additionally or alternatively, the reference devices system 720 may ensure that the reference devices 110 match traffic patterns of the community devices 130. By way of illustration, the reference devices system 720 may ensure that reference devices are matching a speeding and heading of a cluster of uncalibrated community devices.

The community devices 730 may be the same as the community devices 130 discussed above, although any suitable community devices may be employed. For example, the community devices 730 may be comprised of cell phones, tablets, vehicles, home weather monitoring stations, or the like. As is discussed in more detail in the following, the community devices 730 may be calibrated against the reference devices system 720.

The calibration data system 740 may be configured to store, maintain, and/or execute calibration data and/or calibration data processing algorithms related to the weather station 710, reference devices system 720, and/or the community devices 730. For example, the calibration data system 740 may include sensor calibration hierarchy 500 and/or the sensor schema 600 described above.

The calibration triggering system 750 may be configured to store, maintain, and/or execute calibration triggering algorithms and/or data. For example, the calibration triggering system 750 may be configured to obtain and compare GPS coordinates of a weather station in the weather stations 710 and a reference device of the reference devices system 720 to determine if a distance between the weather station and the reference device is less than the distance represented by the weather station-reference device spatiotemporal line 712.

The comparison may take into account a calibration time-duration. For example, the weather station-reference device spatiotemporal line 712 may be a distance that the distance between the weather station and the reference device must be less than during a calibration time-duration. That is, a calibration of the reference device may need to be performed while the distance between the weather station and the reference device over a calibration time-duration is less than the weather station-reference device spatiotemporal line 712. Accordingly, the reference devices system-community devices spatiotemporal line 722 may take into account a calibration time threshold.

These comparisons may determine if the weather station 115 and the reference device 110, and the reference device 110 and the community device 130 are spatiotemporally proximate. By way of example and with more specificity, the calibration pairing of the weather station 115 and the reference device 110 being calibrated against the weather station 115 are spatiotemporally proximate if the reference device 110 can be accurately calibrated against the weather station 115. Similarly, the calibration pairing of a reference device 110 and a community device 130 may be spatiotemporally proximate if the community device 130 are within the reference devices system-community devices spatiotemporal line 722 such that the community device 130 can be accurately calibrated against the reference device 110.

The calibration pairings can be spatiotemporally proximate based on a previously determined measured value. For example, with reference to FIG. 2, the mobile reference device 110*m* that is proximate the community device 130 may obtain a measured value at a location that maintains the measured value for a measured value valid time-period. That is, the measured value against which the community device 130 can be calibrated against may be stored and relied on for future calibrations during a measure value valid time-period. This measured value may have an associated GPS coordinate that can be used to determine if the distance between the mobile reference device 110*m* and the community device 130 is less than the reference devices system-community devices spatiotemporal line 722 for a calibration duration, even though the distance is measured from a prior location of the mobile reference device 110*m*. As a result, although a physical distance between the mobile reference device 110*m* and the community device 130 is never less than the reference devices system-community devices spatiotemporal line 722, the calibration distance may be less than the reference devices system-community devices spatiotemporal line 722.

Figure 8:
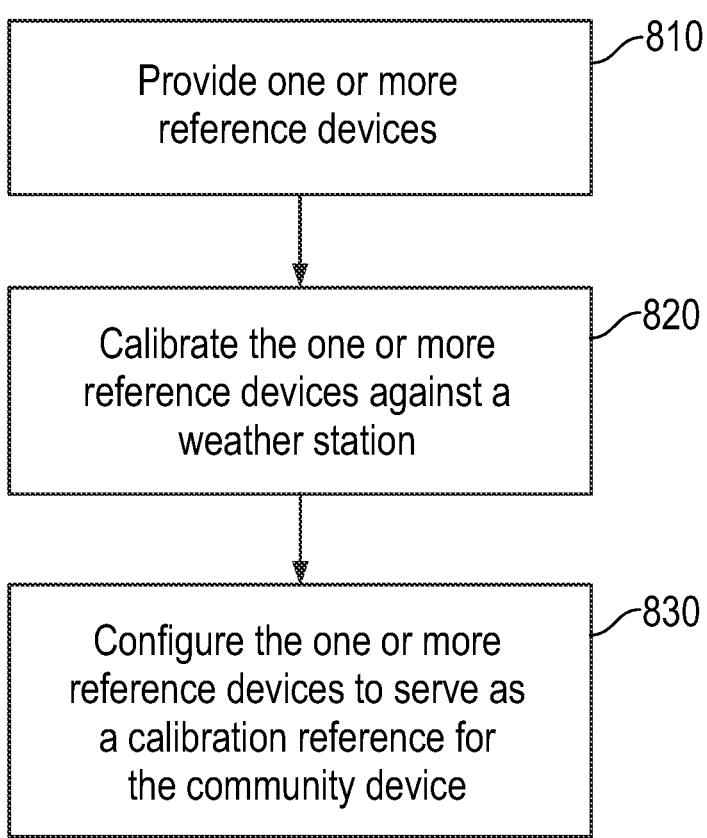
FIG. 8 shows a reference devices method 800 for generating and managing calibration data for sensors used to obtain weather information.

FIG. 8 shows a reference devices method 800 for generating and managing calibration data for sensors used to obtain weather information. As shown in FIG. 8, the reference devices method 800 may provide one or more reference devices in step 810. The one or more reference devices may be the reference devices 110 discussed above, although any suitable reference devices may be employed. In step 820, the reference devices method 800 may calibrate the one or more reference devices against a weather station. The weather station may be the weather station 115 discussed above, although any suitable weather station(s) may be employed. The reference devices method 800 may also configure the one or more reference devices to serve as a calibration reference for a community device in step 830. The community device may be one of the community devices 130 discussed above, although any suitable community device may be employed.

The step 810 of providing the one or more reference devices may comprise providing at least one of a mobile reference device and a stationary reference device, such as the mobile reference device 110*m* and/or the stationary reference device 110*s* described above. A mobile reference device 110*m* may be preferably where variable and adaptable calibration coverage is desired. The stationary reference device 110*s* may be desired where predictable location data of the reference devices 110 may be desired for, for example, simpler calibration triggering algorithms.

The reference devices method 800 may further comprise receiving one of an offset value and a measured value of a weather-related parameter measured by the weather station. For example, the reference devices method 800 may be executed on a calibration that is configured to maintain calibration data for the one or more reference devices 110 of the reference devices system 720. Accordingly, the offset value and/or the measured value may be stored by the calibration server. As a result, a measured value provided by a sensor of a reference device of the one or more reference devices 110 may be corrected to a more accurate value. This more accurate value can subsequently be used to calibrate community devices.

The reference devices method 800 may also comprise at least one of transmitting location information of the one or more reference devices and receiving location information of the weather station to determine if the one or more reference devices can be calibrated against the weather station. For example, a calibration server of the reference devices system 720 may be configured to determine if a reference device of the one or more reference devices 110 are within a reference device calibration distance threshold of a weather station. During calibration of the reference device against the weather station, the offset value and/or the measured value of the weather-related parameter may be obtained from the weather station.

The reference devices method 800 may further comprise transmitting location information of the reference device and receiving location information of the community device to determine if the community device can be calibrated against the reference device. For example, the reference device calibrated against the weather station as discussed above may transmit location information, such as location information of a measured value of a weather-related parameter, to a calibration server to determine if the reference device is within a calibration distance threshold and a calibration time threshold of the community device.

Accordingly, the references devices method 800 may further comprise providing and configuring a calibration server to execute at least one of a calibration triggering algorithm and a calibration algorithm to calibrate the community devices against the one or more reference devices. The calibration server may be the calibration server 120 discussed with reference to FIGS. 2 and 11. Configuring the calibration server to execute the triggering algorithm may comprise configuring the calibration server to receive location information of the reference device and receive location information of the community device and determine if the reference device and the community device are within a calibration distance threshold.

Configuring the calibration server to execute the calibration algorithm may comprises configuring the calibration server to obtain a measured value determined by the reference device measuring the of a weather-related parameter, obtain a measured value determined by the community device measuring the weather-related parameter, and determine an offset value based on the comparison of the measured value determined by the reference device and the measured value determined by the community device.

Figure 9:
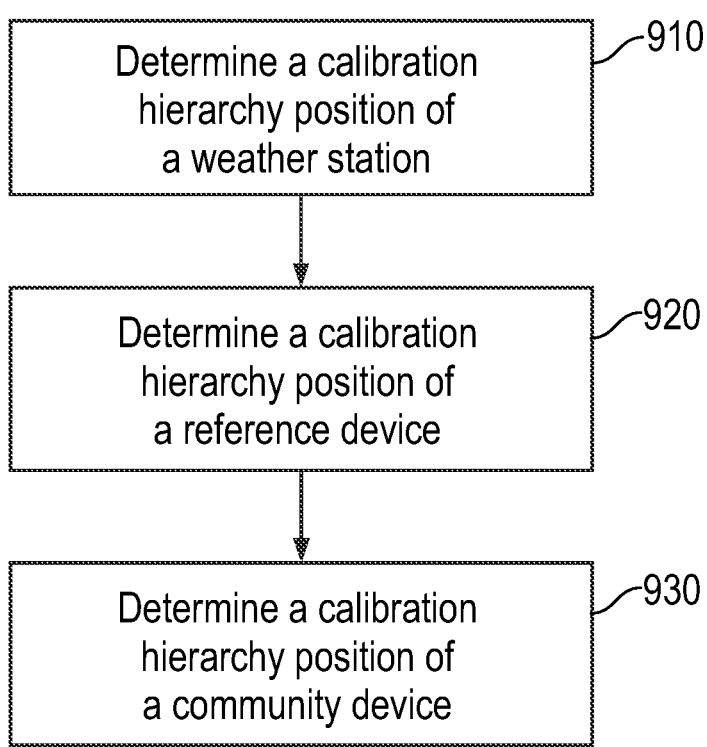
FIG. 9 shows a calibration data method 900 for generating and managing calibration data for sensors used to obtain weather information.

FIG. 9 shows a calibration data method 900 for generating and managing calibration data for sensors used to obtain weather information. As shown in FIG. 9, the calibration data method 900 determines a calibration hierarchy position of a weather station in step 910. The weather station may be the weather station 115 discussed above, although any suitable weather station may be employed. In step 920, the calibration data method 900 may also determine a calibration hierarchy position of a reference device. The reference device may be one of the reference devices 110 discussed above with reference to FIG. 2 although any suitable reference device may be employed. In step 930, the calibration data method 900 may determine a calibration of a hierarchy position of a community device. The community device may be one of the community devices 130 discussed above with reference to FIG. 2, although any suitable community device may be employed.

The calibration data method 900 may further include calibrating the reference device against the weather station and calibrating the community device against the reference device. Additionally or alternatively, the calibration data method 900 may store a sensor calibration hierarchy having a calibration hierarchy of the weather station, the reference device, and the community device. The sensor calibration hierarchy may further comprise a calibration sub-hierarchy of at least one of the weather stations, the reference devices, and the community devices.

The calibration data method 900 may also store and process a sensor schema of a sensor in the reference device. For example, the calibration data method 900 may store and process the sensor schema 600 described with reference to FIG. 6. By way of example, the calibration data method 900 may store calibration data determined by calibrating the reference device against the weather station in the schema. As discussed above, the calibration data may comprise one of an offset value or a measured value obtained from the weather station.

The calibration data method 900 may also store and process a sensor schema of a sensor in the community device. The sensor schema of the sensor of the community device may be the sensor schema 600 discussed above, although any suitable sensor schema may be employed. Similar to the sensor schema for the sensor of the reference device, the calibration data method 900 may store calibration data in the sensor schema for the sensor of the community device may comprise one of an offset value or a measured value obtained from the weather station.

Figure 10:
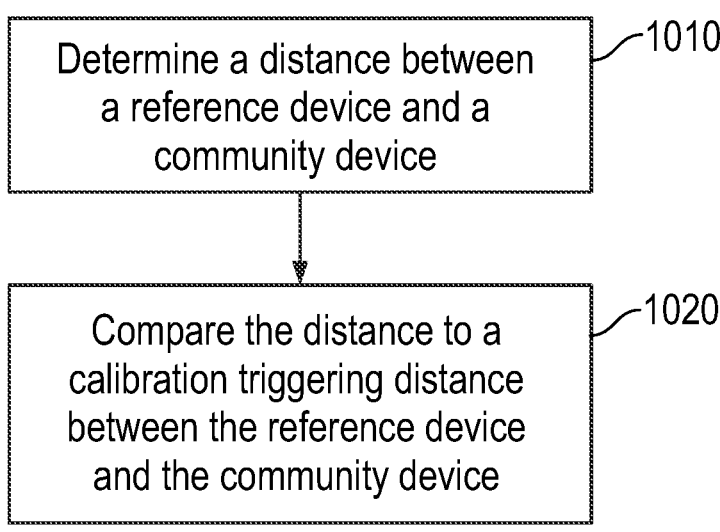
FIG. 10 shows a calibration triggering method 1000 for generating and managing calibration data for sensors used to obtain weather information.

FIG. 10 shows a calibration triggering method 1000 for generating and managing calibration data for sensors used to obtain weather information. As shown in FIG. 10, the calibration triggering method 1000 determines a distance between a reference device and a community device in step 1010. In step 1020, the calibration triggering method 1000 compares the distance to a calibration distance threshold between the reference device and the community device. The reference device may be the reference device 110 discussed above and community device may be the community device 130 discussed above, although any suitable reference device and community device may be employed. As discussed above, the reference device may be calibrated against a weather station.

The calibration triggering method 1000 may further comprise determining if the reference device and the community device are within the calibration distance threshold for a calibration time threshold. For example, a calibration algorithm, such as the calibration algorithm 320*b* discussed above may require a calibration time threshold for the community device to be correctly calibrated. In other words, the reference device and the community device must be within the calibration distance threshold for less than the calibration time threshold. The calibration time threshold may be referred to as a reference device calibration time threshold.

The calibration triggering method 1000 may also receive and compare location information of the reference device and location information of the community device. For example, the calibration triggering method 1000 may be a calibration server of the calibration triggering system 750 that is configured to receive and compare the location information of the reference device and the location information of the community device. The location information of the reference device may be provided by the reference device and the location information of the community device may be provided by the community device, although any suitable means may be employed to determine the location information of the reference device and the location information of the community device.

The calibration triggering method 1000 may further determine if a sensor of the reference device is a calibration reference to a sensor of the community device. For example, the calibration triggering method 1000 may determine if the sensor of the reference device and the sensor of the community device are configured to measure the same weather-related parameter. By way of illustration, the calibration triggering method 1000 may be configured to determine if the reference device and the community device both include sensors that are configured to measure a precipitation rate. The calibration triggering method 1000 may also store and process a calibration triggering algorithm to determine the spatiotemporal proximity between the reference device and the community device.

Figure 11:
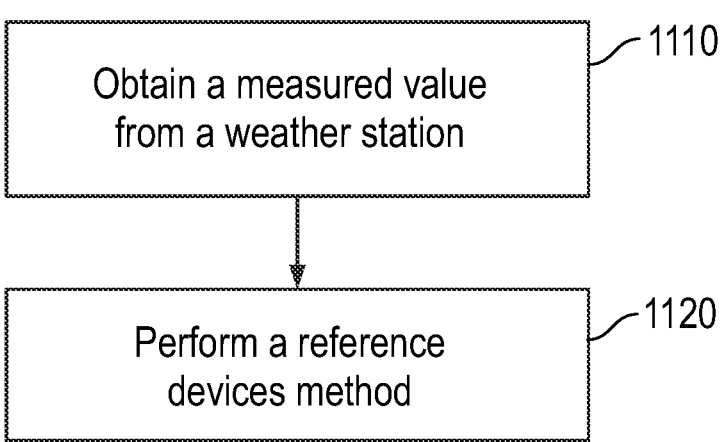
FIG. 11 shows a calibration method 1100 for generating and managing calibration data for sensors used to obtain weather information.

FIG. 11 shows a calibration method 1100 for generating and managing calibration data for sensors used to obtain weather information. As shown in FIG. 11, the method 1100 may obtain a measured value of a weather-related parameter from a weather station in step 1110. The weather station employed by the method 1100 may be the weather station 115 described herein, although any suitable weather station may be employed. In step 1120, the method 1100 may perform a reference devices method, such as the reference devices method 800 described above with reference to FIG. 8. By way of example, the step 1120 may calibrate the one or more reference devices against the weather station. The step 1120 may also configure the one or more reference devices to serve as a calibration reference for a community device. The method 1100 may further comprise other steps.

For example, the calibration method 1100 may perform a calibration data method, such as the calibration data method 900 described above with reference to FIG. 9. Additionally or alternatively, the calibration method 1100 may further comprise a calibration triggering method, such as the calibration triggering method 1000 described above with reference to FIG. 10. Additionally or alternatively, the calibration method 1100 may also calibrate least one of a plurality of community devices against a reference device.

The above calibration methods 800-1100 may be performed on the calibration server 120 described with reference to FIG. 2. The calibration server 120 may be a single server comprised of a single process, single memory, or the like. Additionally or alternatively, the calibration server 120 may be comprised of multicomponent, distributed resources, or the like. By way of example, processors and/or memories in the reference devices 110 and/or community devices 130 may be employed to perform the above discussed calibration methods 800-1000, as is discussed in more detail in the following.

Figure 12:
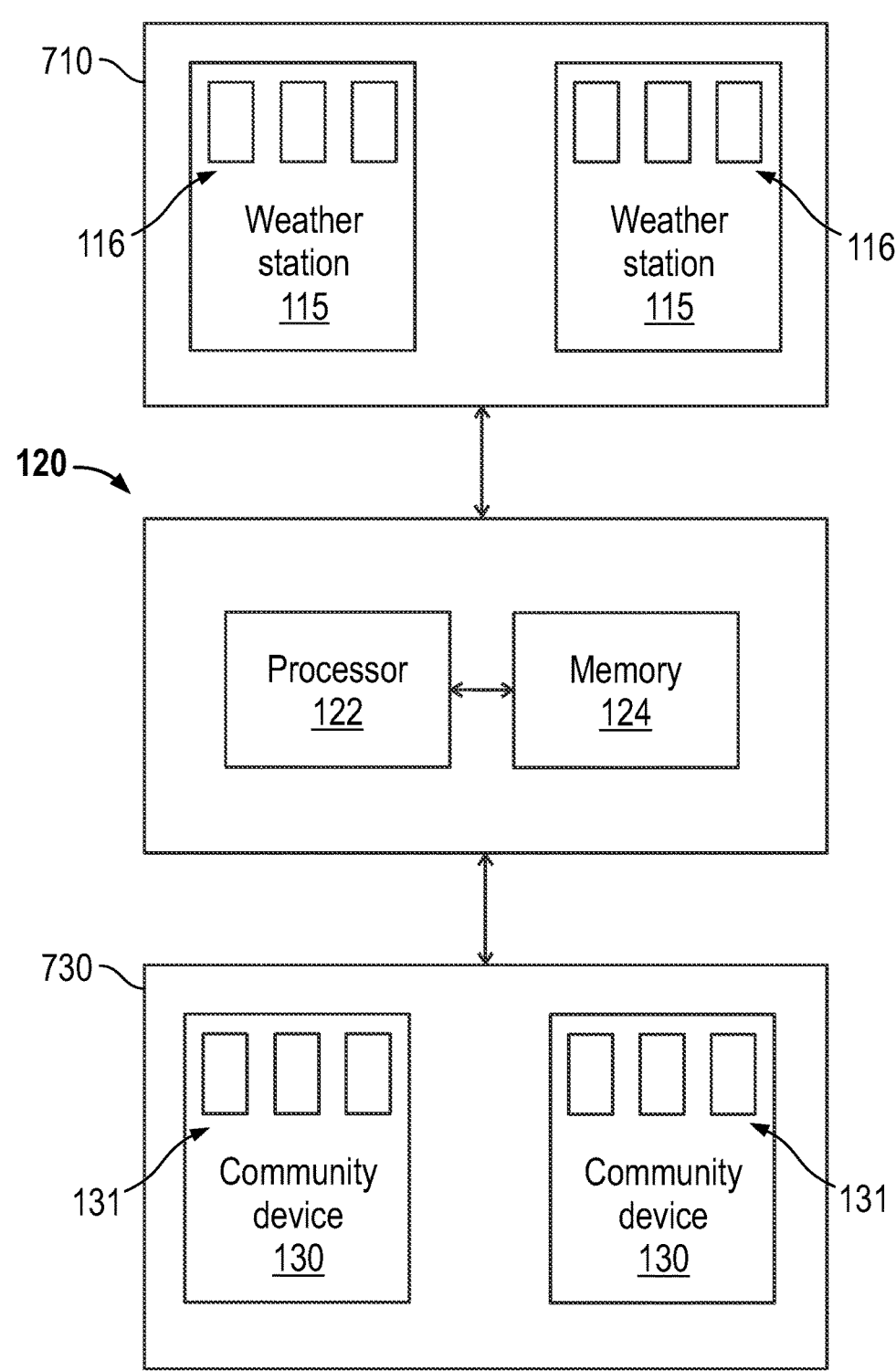
FIG. 12 shows the calibration server 120 for generating and managing calibration data for sensors used to obtain weather information.

FIG. 12 shows the calibration server 120 for generating and managing calibration data for sensors used to obtain weather information. Also shown in FIG. 12 are weather stations 710 and community devices 730 that are communicatively coupled to the calibration server 120. The weather stations 710 is shown as being comprised of two weather stations 115, although more or fewer may be employed. The weather stations 115 includes sensors configured to measure a weather-related parameter. The community devices 730 is shown as being comprised of two community devices 130 although more or fewer may be employed. The community device 130 is shown as including sensors 131 configured to measure a weather-related parameter and/or parameters from which weather-related parameter values may be inferred. The calibration server 120 is shown as being comprised of a processor 122 that is communicatively coupled to a memory 124.

The processor 122 may be comprised of one or more processors. For example, the processor 122 may be a single processor in a server. Alternatively, the processor 122 may be comprised of multiple processors, or portions therefore, that are communicatively coupled to each other. For example, the processor 122 may be comprised of processing resources of processors in the weather station 710, the community devices 730, one or more reference devices 110 of the reference devices system 720, the calibration data system 740, and/or the calibration triggering system 750. By way of illustration, a cloud service that is configured to operate as a server for the calibration triggering system 750 could be configured to receive location information of a community device of the community devices 730 and location information of a reference device 110 of the reference devices system 720 and determine if the community device is within a calibration threshold.

The memory 124 may be comprised of one or more memories. For example, the memory 124 may be a single board in a server. Alternatively, the memory 124 may be comprised of a plurality of memories, or portions therefore, that are configured to store calibration related information. For example, the memory 124 may be comprised of memories of one or more reference devices 110 of the reference devices system 720 may be used by a calibration server 120 for the calibration data system 740. Accordingly, the memory 124 may be configured to store, for example, the calibration algorithm 320b and/or the calibration triggering algorithm 320a.

The calibration systems 100-400, 700 and calibration methods 800-1100 can manage calibration data for sensors used to obtain weather information. For example, the calibration system 100 may include reference devices 110 that are calibrated against weather stations 115 and used to calibrate community devices 130. Due to being calibrated against weather stations 115, which are accurate and precise, the reference devices 110 may also be accurate and precise. The reference devices 110 may be much more widely available, both spatially and temporally, to the community devices 130 than the weather stations 115. By way of examples, a city with an airport may only have a few weather stations 115 spread over 400 square miles whereas the same city may have hundreds of reference devices dispersed throughout the city.

The calibration system 700 may include the reference devices system 720, the calibration data system 740, and the calibration triggering system 750 to manage the calibration data. For example, the reference devices system 720 can ensure that the mobile reference devices 110m of the reference devices 110 are located at optimal locations throughout a geographical location by taking into account, for example, density and distribution of community devices 130. This can increase the frequency of calibration times. The reference devices system 720 may also, for example, match traffic patterns to optimize calibration times.

The calibration data system 740 can maintain the calibration data for the reference devices 110 and the community devices 130 to ensure that, for example, data is not used from an out-of-date community device due to calibration persistence time being exceeded. Measured values from community devices 130 that are out of calibration may therefore not be used for, for example, weather forecasting.

The calibration triggering system 750 can ensure, for example, that reference devices 110 and community devices are suitable for the calibration algorithm and are spatiotemporal proximate. For example, calibration triggering system 750 may determine if the sensors of the reference device 110 is suitable for calibrating the sensors in the community device 130. Additionally or alternatively, the calibration triggering system 750 can ensure that the reference device 110 and the community device 130 are within a calibration distance threshold and a calibration time threshold. These and other steps performed by the calibration triggering system 750 can ensure that the community device is correctly calibrated so as to provide accurate measured values of weather-related parameters.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined, in whole or in part, to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other systems and methods for using weather data to improve weather information and not just to the embodiments described above and shown in the accompanying figures. Accordingly, the scope of the embodiments described above should be determined from the following claims.

I claim:

1. A system comprising:
a reference device; and
a community device comprising:
   a sensor;
   a processor; and
   memory storing instructions that, when executed by the processor cause the system to perform operations including:
   determining a distance between the reference device and the community device;
   in response to determining that the distance is less than a calibration distance threshold, generating a calibration value for the community device based on a calibrated reference device measured value received from the reference device and a first measured value from the sensor;
   in response to receiving a second measured value from the sensor and determining that a calibration persistence period that began when the calibration value was generated is not elapsed, generating a calibrated measured value based on the second measured value and the calibration value, wherein the calibrated reference device measured value is calibrated against a weather station measured value received from a weather station; and
   sending the calibrated measured value to a forecasting module configured to generate a value forecasting a condition based on the calibrated measured value.

2. The system of claim 1, wherein calibrating the community device based on the calibrated reference device measured value received from the reference device further comprises determining that the reference device and the community device are within the calibration distance threshold during a predetermined time-interval.

3. The system of claim 1, wherein determining the distance between the reference device and the community device comprises receiving location information from the reference device and receiving location information from the community device.

4. The system of claim 1, wherein calibrating the community device based on the calibrated reference device measured value received from the reference device further comprises determining that a sensor of the reference device is a calibration reference to a sensor of the community device.

5. The system of claim 1, wherein the processor and memory storing instructions are part of a calibration server located remotely from the community device and the reference device.

6. A method comprising:
determining a distance between a reference device and a community device;
in response to determining that the distance is less than a calibration distance threshold, generating a calibration value for the community device based on a calibrated reference device measured value received from the reference device and a first measured value from a sensor of the community device;
in response to receiving a second measured value from the sensor and determining that a calibration persistence period that began when the calibration value was generated is not elapsed, generating a calibrated measured value based on the second measured value and the calibration value, wherein the calibrated reference device measured value is calibrated against a weather station measured value received from a weather station; and
sending the calibrated measured value to a forecasting module configured to generate a value forecasting a condition based on the calibrated measured value.

7. The method of claim 6,
wherein calibrating the community device based on the calibrated reference device measured value received from the reference device further comprises determining that the reference device and the community device are within the calibration distance threshold during a predetermined time-interval.

8. The method of claim 6, wherein determining the distance between the reference device and the community device comprises receiving location information from the reference device and receiving location information from the community device.

9. The method of claim 6, wherein calibrating the community device based on the calibrated reference device measured value received from the reference device further comprises determining that a sensor of the reference device is a calibration reference to a sensor of the community device.

10. The method of claim 6, wherein calibrating the community device based on the calibrated reference device measured value received from the reference device further comprises:
receiving the calibrated reference device measured value determined using a reference measured value received from the reference device for a weather-related parameter and a weather station-reference device offset value; and
determining a reference-community device offset value by comparing the calibrated reference device measured value and the first measured value from the community device, a calibrated measured value being further based on the first measured value.

* * * * *